Sept. 8, 1936.  P. A. KETCHPEL  2,053,722
LOCOMOTIVE STOKER
Filed July 26, 1932  2 Sheets-Sheet 1
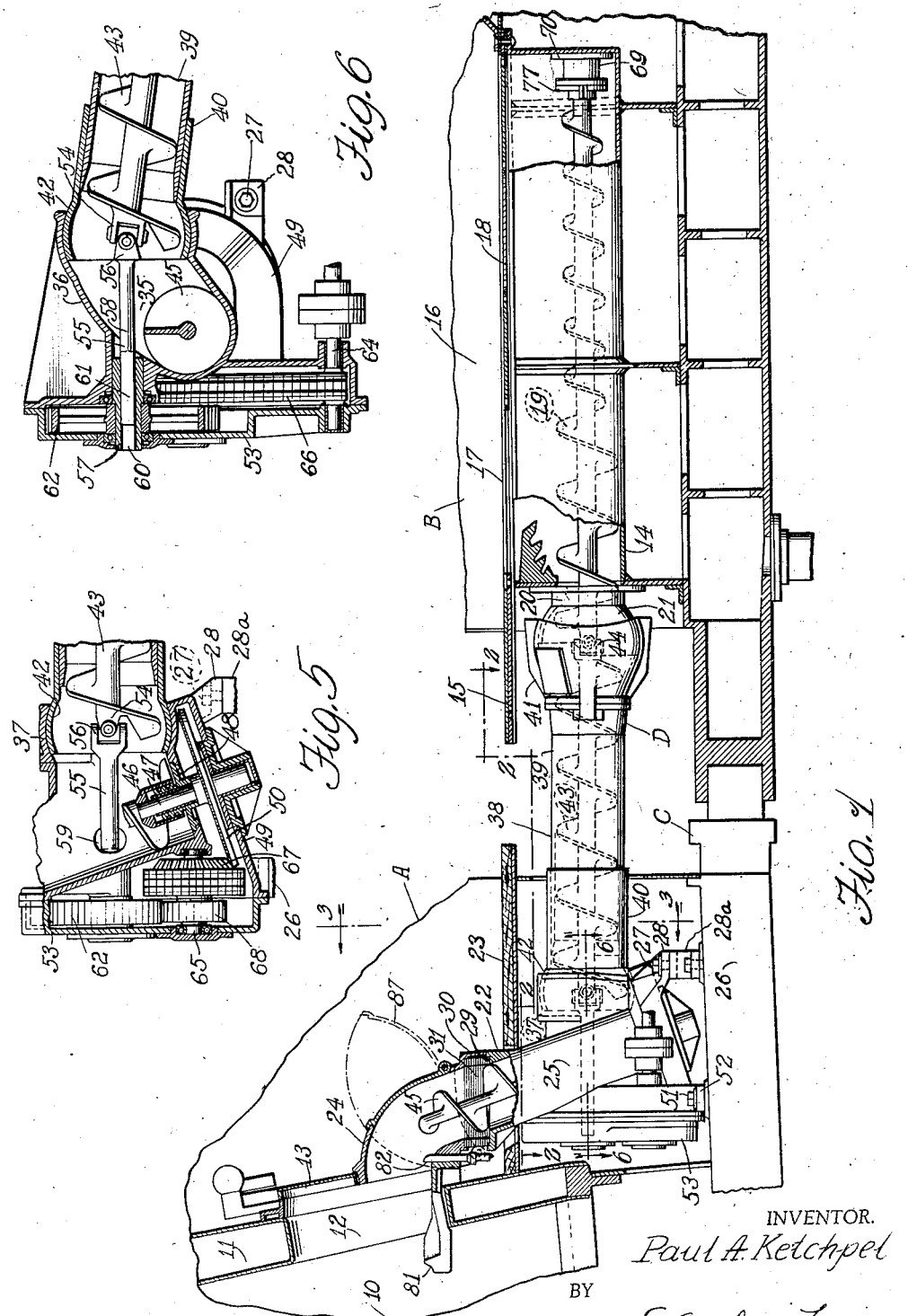
INVENTOR.
Paul A. Ketchpel
BY
E. Archer Turner
ATTORNEY.

Sept. 8, 1936.     P. A. KETCHPEL     2,053,722
LOCOMOTIVE STOKER
Filed July 26, 1932     2 Sheets-Sheet 2
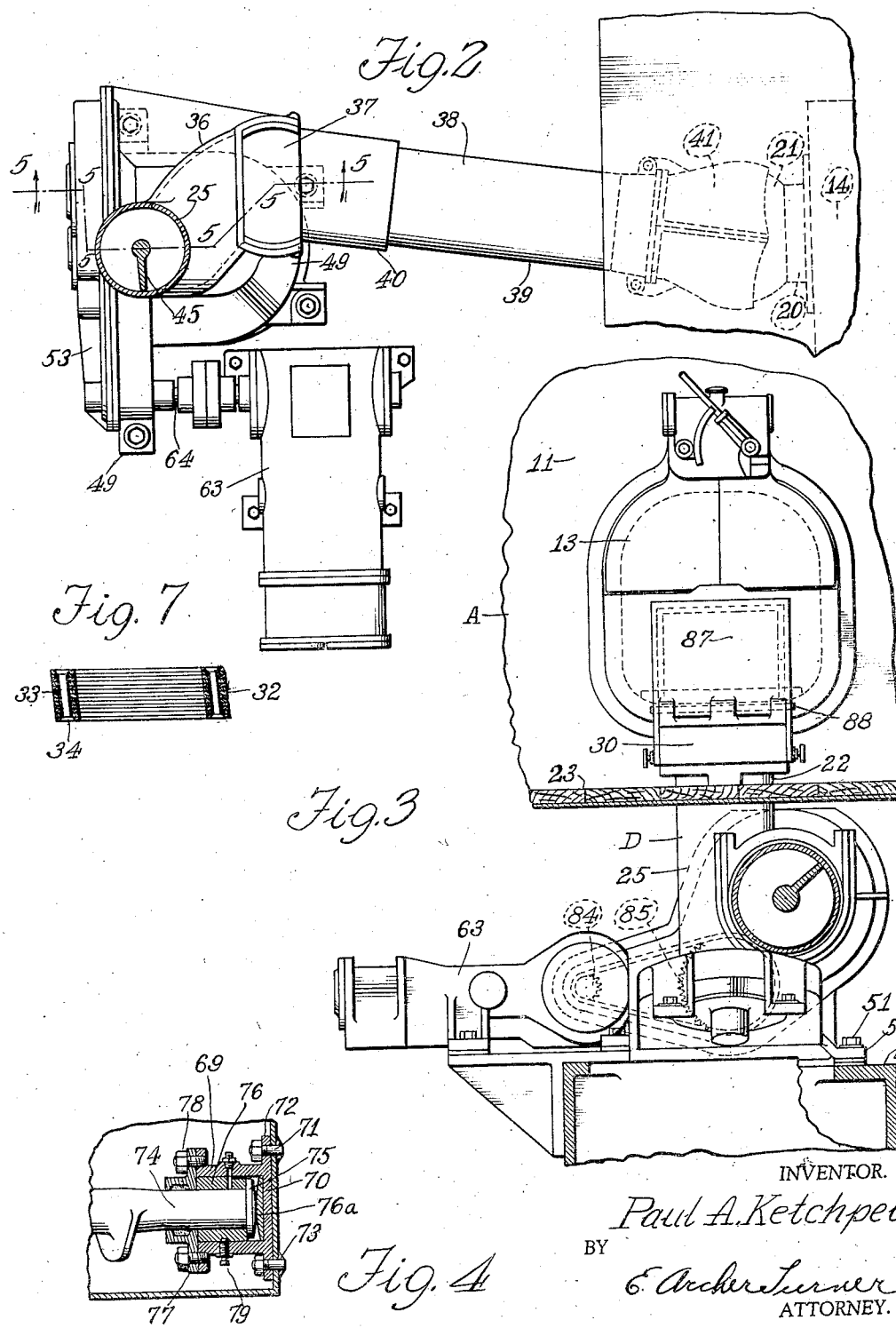

Patented Sept. 8, 1936

2,053,722

UNITED STATES PATENT OFFICE 2,053,722

LOCOMOTIVE STOKER

Paul A. Ketchpel, West Englewood, N. J., assignor to The Standard Stoker Company, Incorporated, a corporation of Delaware Application July 26, 1932, Serial No. 624,695

5 Claims. (Cl. 198—15)

My invention relates to locomotive stokers of the type in which a system of conduits and conveyors deliver fuel from the tender to the locomotive and raise it to a suitable elevation for scattering over the grates. More particularly, the invention relates to locomotive stokers of the type described in which the screw transferring fuel from the tender to the locomotive and the screw elevating fuel to the point of distribution are operated from their adjacent ends.

One of the objects of this invention is to provide a novel and improved construction and arrangement of a stoker of the type described and its driving means.

In stokers comprising a plurality of conduit sections it is common to have a conduit section rigidly secured to one part of the locomotive and a communicating conduit section rigidly secured to another part of the locomotive, for example, the upper portion of the fuel elevating conduit may be rigidly secured to the firebox backwall and the lower portion of the fuel elevating conduit may be rigidly secured to the locomotive frame. In such instances due to contraction or expansion of one part or another of the locomotive, or from other causes, the one conduit section will move with respect to the other placing their communicating ends out of register. Not only is there an economic loss due to the escape of fuel between the communicating ends of the conduit sections when they are not in register, but also considerable abrasion of the fuel occurs between the elevating screw and the inwardly projecting edge of the one conduit when it is not in absolute register with the other. It is therefore, another object of this invention to provide a flexible sealing arrangement which will prevent the escape of fuel between the communicating ends of the conduits and which will provide a passage between the communicating ends of the conduits when they are not in register thereby minimizing the abrasion of the fuel.

It is still another object of the invention to provide in a stoker, a conduit and screw conveying system for transferring fuel from the tender to the locomotive, arranged to be operated from its forward end and having a novel lubricated thrust bearing disposed in the conduit at the rearward end of the screw conveyor.

Other and further objects and advantages of the invention will appear from the following description taken in connection with the accompanying drawings, in which Figure 1 is a central longitudinal section of a portion of the locomotive and tender with a stoker embodying the invention applied thereto, the stoker being shown in elevation with portions thereof broken away;

Figure 2 is a view taken on the broken lines 2—2—2—2 of Figure 1;

Figure 3 is a sectional view taken on the line 3—3 of Figure 1;

Figure 4 is a fragmentary enlarged view in central vertical longitudinal cross section of the rear portion of the tender trough showing the thrust bearing in detail;

Figure 5 is a sectional view on the irregular line 5—5 of Figure 2;

Figure 6 is a sectional view taken on the line 6—6 of Figure 1; and

Figure 7 is a modified form of the sealing means.

In the drawings the locomotive is represented generally by the letter A, the tender by the letter B, the coupling member by the letter C and the stoker applied to the locomotive and tender by the letter D.

The locomotive is provided with a firebox 10 having a backwall 11, the latter having an opening 12 therethrough for hand and mechanical delivery of fuel to the firebox. The upper portion of the firing opening 12 is closed by the firedoor 13 while the lower portion is arranged to receive the discharge end of the stoker D.

The stoker D includes a trough member 14 fixedly mounted beneath the floor 15 of the tender and is arranged to receive fuel from the bin 16 through an elongated opening 17 in the tender floor 15. Slidable plates 18 are mounted in the customary manner to completely close the opening 17 or to partially close the opening as desired. A screw conveyor 19 is mounted in the trough 14 for advancing fuel therethrough. The forward end of the trough 14 terminates in an extension 20 provided with the spherical shell 21.

A riser conduit 22 extends downwardly and rearwardly from the firing opening 12 through the locomotive cab deck 23. It comprises a separable curved hood or mouth member 24 rigidly secured at its forward end to the backwall 11, and a straight tubular conduit 25 which is rigidly secured at its lower end to the locomotive frame 26 in any desired manner as by the bolts 27 passing through the flanges 28 and the bracket 28a which in turn is rigidly secured to the frame 26. The hood or mouth portion 24 is provided with a door 87 arranged to swing open rearwardly about the hinge 88 permitting access to the interior thereof for purposes of inspection or repair. When handfiring the locomotive, the door 87 is swung open rearwardly and forms a hopper which when filled permits fuel to roll down evenly to the point of distribution. Since the hood or mouth member 24 is rigid with the backhead 11 and will move therewith as contraction and expansion of the boiler occurs, and the straight tubular conduit 25 is rigid with the frame 26, the communicating ends of the mouth member 24 and conduit 25 will frequently be out of register permitting fuel leakage and causing abrasion of fuel against the inwardly projecting lower edge of the mouth member 24.

The present construction eliminates these objectionable features by providing a seat 29 in the top marginal edge of the tubular conduit 25, further providing an apron 30 depending from the lower marginal edge of the mouth member 24 and mounting a compressed spring coil 31 within the apron 30 and resting in the seat 29. The coil 31 consists of a closely wound flexible helix and thus forms an effective seal against leakage of fuel and also forms a flexible passage between the mouth member 24 and conduit 25 eliminating projecting edges in the path of the fuel against which it would be crushed.

In Figure 7 is shown a modified form of sealing member, comprising a plurality of rings 32 provided with registering perforations 33 through which are passed flexible pins 34 for holding the rings 32 in flexible engagement.

The tubular conduit 25 is provided in the lower portion of its cylindrical wall with a laterally directed opening 35, bounding which opening is a short laterally and rearwardly curving tubular wall portion 36. The open rearward end of the tubular wall portion 36 is offset laterally from the lower end of the riser conduit 22 and carries a spherical clamp 37.

An intermediate conduit 38, forming with the trough member 14 a transfer section for passing fuel from the tender to the locomotive, comprises the telescopically related sections 39 and 40. The telescopic section 39 carries at its rearward end a vertically split clamp 41 arranged to receive the spherical shell 21, forming a flexible connection, and the telescopic section 40 carries at its forward end a spherical shell 42 arranged to be received in the spherical clamp 37, forming a flexible connection. A screw conveyor 43 is mounted in the conduit 38 and is connected at its rearward end to the forward end of the screw 19 by a universal connection 44.

Fuel is elevated in the riser conduit 22 by a screw 45 equipped at its lower end with a sealing ring or dust guard 46 and a stub shaft 47, which latter projects through the bottom 48 of the riser conduit 22 into a gear housing 49, where it is equipped with a bevel gear 50, through which it is driven. The gear housing 49 is preferably formed integral with the riser conduit 22, though obviously if desired, it may be formed as a separate unit. Bolts 51 passing through the flanges 52 into the frame 26 rigidly secure the gear housing 49 to the locomotive frame. A detachable cover 53 is provided for the gear housing 49 to permit installation of and access to the gearing.

The shaft of the screw conveyor 43 is provided at its forward end with one element 54 of a universal joint. A shaft 55 carries a complementary element 56 of a universal joint which, with the element 54, forms a flexible connection. The shaft 55 comprises the telescopically related segments 57 and 58 and extends forwardly from the screw conveyor 43 through an aperture 59 in the curving wall portion 36. The shaft segment 57 is journalled in the gear housing 49 and cover 53 and is provided with a square opening 60 extending longitudinally therethrough. The shaft segment 58 is provided at its forward end with a portion 61 that is square in transverse cross section and is longitudinally slidable in the opening 60 of the shaft segment 57. A spur gear 62 is mounted in the gear housing 49 on the shaft segment 57 of the telescopic shaft 55.

Power to drive the stoker is generated by a motor 63, conveniently located, either on the locomotive as illustrated or on the tender if preferred, and is transmitted to the shaft 64 journalled in the gear housing 49. Power is transmitted from the shaft 64 to the countershaft 65 journalled in the gear housing 49, through a chain 66 passing over sprockets 84 and 85 mounted on the shafts 64 and 65. From the countershaft 65 power is transmitted to the elevating screw 45 through the engaged bevel gears 67 and 50, the gear 67 being mounted on the shaft 65 and the gear 50 on the stub shaft 47. From the countershaft 65 power is transmitted to the screw in the transfer conduit section through the pinion 68 mounted on the shaft 65 and engaging the spur gear 62 mounted on the telescopic shaft 55.

In conveying fuel through a conduit by means of a helicoid screw, it is discharged therefrom more to one side of a vertical plane passed through its longitudinal center line than the other. Thus, a screw that advances fuel forwardly when rotated in a clockwise direction has a tendency to deliver most of its charge to the left side of its center line. In the present construction the adjacent ends of the screws 43 and 45 are in close proximity, and when the screw 43 is rotated in a clockwise direction, the fuel is discharged therefrom towards the screw 45 and away from the shaft 55, thereby permitting unobstructed and free flow of fuel from one screw to the other, at the same time, permitting the two screws to be driven from their adjacent ends through gearing which is compactly and conveniently arranged beneath the locomotive cab deck adjacent the communicating ends of the riser and transfer conduits.

Elevating of fuel through a riser conduit is accomplished through the cooperation of a screw and the close fitting walls of the conduit enclosing the screw. In the present construction, in order to bring the fuel discharged by the transfer screw 43 to the point where the riser screw 45 and the walls of the riser conduit 22 are close fitting, in the shortest path, the flights and the direction of rotation of the riser conduit screw 45 are arranged so that the screw 45 will sweep the fuel delivered by the transfer screw 43 in a direction away from the transfer screw 43 and rearwardly of the hub of the riser conduit screw 45.

The fuel transferring screw conveying system comprising the screws 43 and 19 since it is longitudinally movable at its driven end, is provided at its rearward end within the trough 14 with a novel form of thrust bearing 69 securing the screw conveying system against rearward movement when it advances fuel and against forward movement when the direction of rotation of the screw is reversed. The bearing 69 comprises a cylinder 70 rigidly secured to the rear wall of the trough 14 by bolts 71 passing through the flange 72 and the trough rear wall. Welding 73 may be applied to the bolts 71 where they penetrate through the rear wall of the trough 14 in order to provide a water tight trough. The shaft 74 of the screw 19 extends into the cylinder 70 and carries a collar 75 at its rearward end which butts against the thrust button 76a arresting rearward movement of the screw 19. Forward movement of the screw 19 is arrested by the split bushing 76 which fits in the cylinder 70 and around the shaft 74 abutting the collar 75 of the screw 19. A split cover 77 fitting over the cylinder 70 and secured thereto through the bolts 78 maintains the bushing 76 between the confines of the collar 19 and the cover 77, as clearly shown in Fig. 4. Rotation of the bushing 76 with the shaft 74 is prevented by a pin 79 threaded through the cylinder 70 and engaging the bushing 76. A groove 80 is provided through the cylinder 70 and bushing 76 to permit lubrication of the interior of the bearing 69.

The fuel conveyed through the conduit organization may be scattered over the fire in any suitable manner. For purposes of illustration a distributor plate 81 is shown over which fuel is projected by a blast of pressure fluid issuing from a distributor head 82.

I claim:

1. In combination with a locomotive having a firebox, a stoker conduit system for the delivery of fuel to the firebox, said conduit system comprising a conduit section rigidly secured to one element of the locomotive and a second conduit section rigidly secured to another element of the locomotive movable relative to said first named element, said conduit sections communicating in abutting end to end relation whereby said conduit sections move bodily with respect to each other as relative movement between said locomotive elements occurs, and a flexible sealing member arranged to be received by the abutting ends of said conduit sections, said sealing member forming with said conduit sections a continuous conduit when relative bodily displacement of one conduit section with respect to the other occurs.

2. In combination with a locomotive having a a frame and a firebox having a backwall with a firing opening therethrough, a stoker including a riser conduit for delivering fuel to said firing opening, said riser conduit comprising a curved mouth portion communicating with said firing opening and rigidly secured to said backwall and a straight tubular portion rigidly secured to the locomotive frame and communicating with said curved mouth portion in abutting end to end relation whereby said mouth portion and said tubular portion move bodily with respect to each other as relative movement between said locomotive frame and firebox backwall occurs, and a flexible sealing member arranged to be received by the communicating ends of said conduit sections, said sealing member forming with said conduit sections a continuous conduit when relative bodily displacement of one conduit section with respect to the other occurs.

3. In combination with a locomotive having a firebox, a stoker conduit system for the delivery of fuel to the firebox, said conduit system comprising a conduit section rigidly secured to one element of the locomotive and a second conduit section rigidly secured to another element of the locomotive movable relative to said first named element, said conduit sections communicating in abutting end to end relation whereby said conduit sections move bodily with respect to each other as relative movement between said locomotive elements occurs, the inner wall of each of said conduit sections at their communicating ends being provided with a recess forming a seat, and a flexible sealing member arranged to be received in said seats and forming with said conduit sections a continuous conduit when relative bodily displacement of one conduit section with respect to the other occurs.

4. In combination with a locomotive having a frame and a firebox having a backwall with a firing opening therethrough, a stoker including a riser conduit for delivering fuel to said firing opening, said riser conduit comprising a curved mouth portion communicating with said firing opening and rigidly secured to said backwall and a straight tubular portion rigidly secured to the locomotive frame and communicating with said curved mouth portion in abutting end to end relation whereby said mouth portion and said tubular portion move bodily with respect to each other as relative movement between said locomotive frame and firebox backwall occurs, the inner wall of each of said conduit sections at their communicating ends being provided with a recess forming a seat, and a flexible sealing means arranged to be received in said seats forming a continuous passage from one of said conduit portions to the other when relative bodily displacement of one conduit section with respect to the other occurs.

5. In combination with a locomotive having a frame and a firebox having a backwall with a firing opening therethrough, a stoker including a riser conduit for delivering fuel to said firing opening, said riser conduit comprising a curved mouth portion communicating with said firing opening and rigidly secured to said backwall and a straight tubular portion rigidly secured to the locomotive frame and communicating with said curved mouth portion, the inner wall of each of said conduit sections at their communicating ends being provided with a recess forming a seat, and a plurality of metallic rings flexibly connected together and arranged to be received in said seats and forming with said conduit sections a continuous conduit.

PAUL A. KETCHPEL.